Feb. 11, 1947. C. H. JORGENSEN Re. 22,840

AUTOMATIC CHOKE MECHANISM AND CHOKE VALVE

Original Filed Oct. 17, 1934 2 Sheets-Sheet 1

INVENTOR
Clarence H. Jorgensen
BY
Spencer Hardman & Fehr
ATTORNEYS

Feb. 11, 1947. C. H. JORGENSEN Re. 22,840

AUTOMATIC CHOKE MECHANISM AND CHOKE VALVE

Original Filed Oct. 17, 1934 2 Sheets-Sheet 2

INVENTOR
Clarence H. Jorgensen
BY
Spencer Hardman & Fehr
ATTORNEYS

Reissued Feb. 11, 1947

Re. 22,840

UNITED STATES PATENT OFFICE 22,840

AUTOMATIC CHOKE MECHANISM AND CHOKE VALVE

Clarence H. Jorgensen, Anderson, Ind., assignor to General Motors Corporation, Detroit, Mich., a corporation of Delaware Original No. 2,327,903, dated August 24, 1943, Serial No. 748,605, October 17, 1934. Application for reissue October 11, 1943, Serial No. 505,861

21 Claims. (Cl. 261—39)

This invention relates to an automatic choke mechanism for automatically controlling the choke or air intake valve of a charge forming device for an internal combustion engine to facilitate starting of the engine and to a novel form of choke valve.

It is an object of the present invention to provide an automatic choke mechanism in which the choke valve is controlled by the joint action of engine suction and thermally responsive means which is so designed that the valve is positioned by said thermally responsive means to increase the proportion of fuel in the combustible mixture inversely in accordance with the temperature adjacent said thermally responsive means and is operable by engine suction to decrease the proportion of fuel in the combustible mixture upon increase of suction effective on said valve.

It is a further object of the invention to provide a choke valve having a part adapted to completely close the air intake passage when in closed position and may be moved to position to fully open the intake passage, and is provided with a second part which is movable independently of the first mentioned part, but is resiliently held in position to restrict the air intake passage when said first mentioned part is in partly opened position.

It is a further object of the invention to provide a choke valve constructed as set forth in which the second mentioned part is movable by the blast of the entering air when the first mentioned part is in partly opened position and to provide means to positively move the said second mentioned part to a position where it does not restrict the intake passage at all when the first mentioned part of said valve is in fully open position.

It is a still further object of the invention to provide a choke valve of the type described and means for positively positioning the first mentioned part of said valve by means of a thermally responsive device and by means of engine suction in the manner previously set forth.

Further objects and advantages of the present invention will be apparent from the following description, reference being had to the accompanying drawings wherein a preferred embodiment of the present invention is clearly shown.

Figures 1, 7:
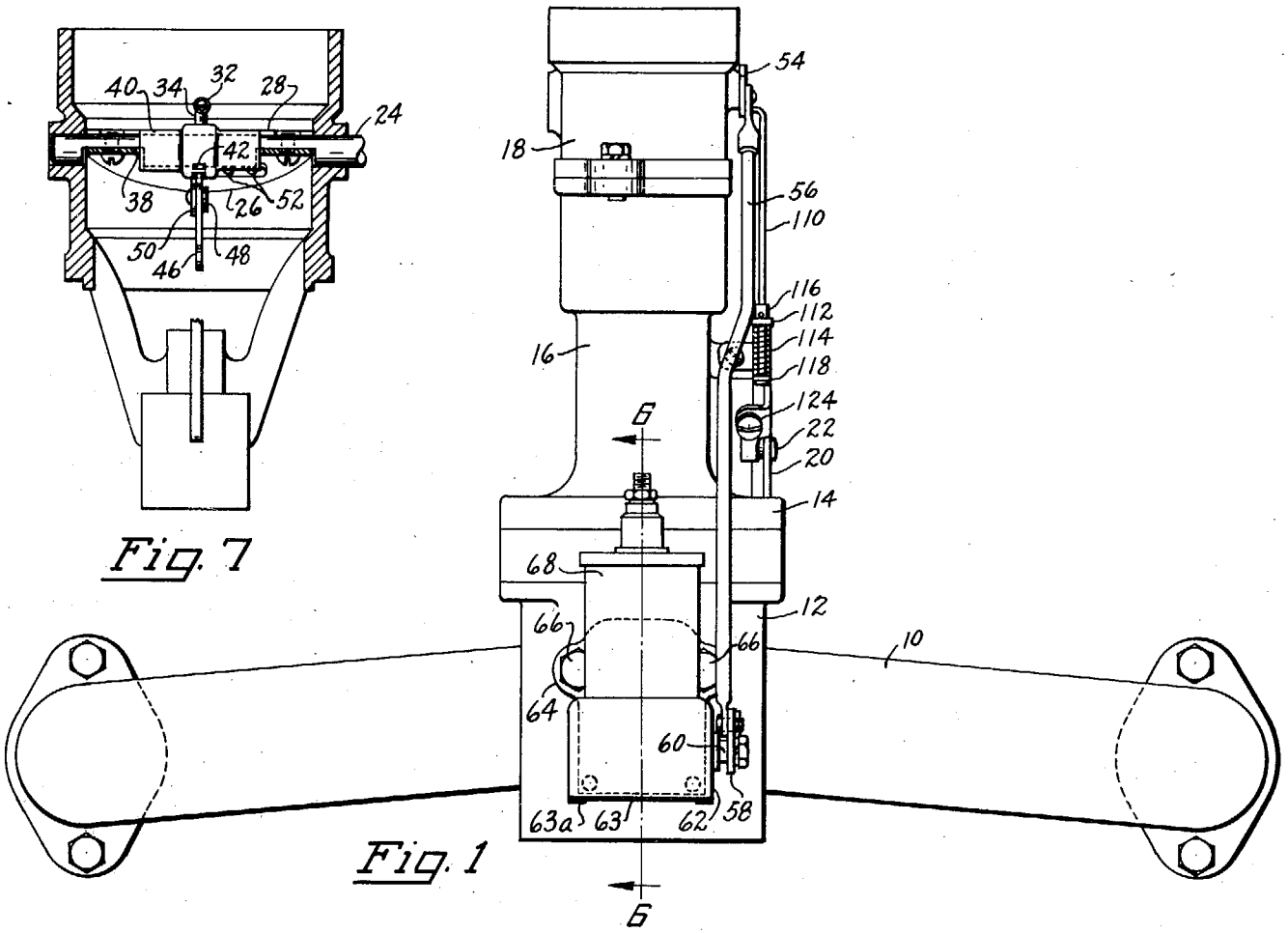
Fig. 1 is a side elevation of an intake manifold and carburetor unit in which a choke valve and operating mechanism therefor constructed in accordance with the present invention, is embodied.
Fig. 7 is a detail section on line 7—7 of Fig. 4.

Referring to the drawings, the intake manifold is indicated at 10 and is provided with a hot spot 12, to which is secured a downdraft carburetor unit 14, that illustrated in the drawings being the well known Carter carburetor which need not be described in detail. The carburetor unit is provided with a main housing 16 in which the main intake passage is located and received in the upper end of this housing is an air intake coupling 18 in which the choke valve hereinafter described is positioned. Shown in Fig. 2 is an operating arm 20 secured to the end of a spindle 22 on which is mounted a throttle valve (not shown) of ordinary construction which regulates the flow of combustible mixture to the engine in the usual manner.

Figures 2, 3, 4, 5, 6:
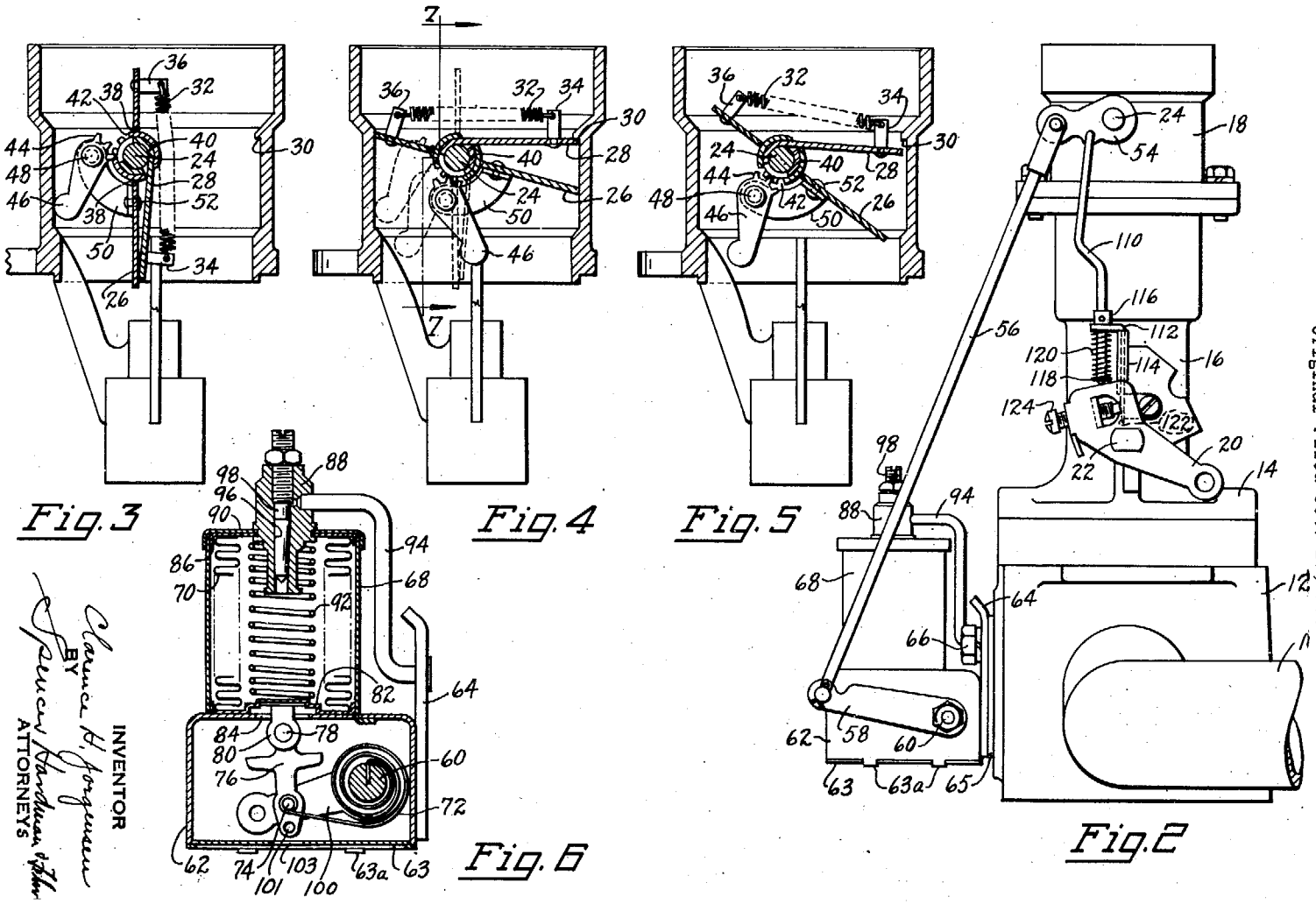
Fig. 2 is an end elevation of the manifold and carburetor.
Figs. 3, 4 and 5 are detail sections through the air intake of the carburetor showing the choke valve in different positions.
Fig. 6 is a section on the line 6—6 of Fig. 1.

Journalled in the intake coupling 18 is a spindle 24 to the flat portions of which adjacent the ends is secured a choke valve 26 which is of such size as to completely close the intake passage as shown in Fig. 4. Associated with the valve 26 is a half valve 28 which is adapted when the choke valve 26 is in the position shown in Fig. 4 to be held against a shoulder 30, formed on the inner wall of the air intake coupling, by a spring 32, one end of which is attached to a pin 34 extending from the half valve and at its other end to a similar pin 36 projecting from the main choke valve 26.

The main valve 26 is rigidly secured to the spindle 24 by screws while the half valve 28 is rotatable with respect to said spindle. To this end the main valve 26 is provided with an opening 38 at the middle part thereof and through this opening an extending tongue 40 of the half valve is projected being bent into cylindrical form as shown in the drawings so that it is rotatably journalled on a cylindrical portion of the spindle 24 formed at the middle part thereof and fits sufficiently loosely to rotate freely thereon.

The hub portion of the half valve has a raised portion at the center which may be formed by brazing a separate piece to the hub or in any other suitable way and is provided with a series of orifices 42 which cooperate with gear teeth 44 formed on the end of an arm 46 pivotally mounted by a pin 48 on an arm 50 secured to the valve 26 by pins 52.

The operation of this valve mechanism is substantially as follows. When the valve is in closed position, the parts are in the position shown in Fig. 4, the spring 32 holding the half valve 28 against the shoulder 30 as previously described. When the main valve 26 is moved to partly open position, by means to be presently described, the parts assume the position shown in Fig. 5. It will be noted that in this position of the main valve the half valve may lay behind the main valve to restrict the intake passage to a greater degree than the main valve as shown in said Fig. 5, or may move to a position to restrict said passage to the same degree as does the main valve, the position of the half valve being dependent on the air pressure effective thereon, its opening movement being opposed by the action of the spring 32.

When the valve 26 is moved to full open position, as shown in Fig. 3, the arm 46 is moved into engagement with the inner surface of the air intake coupling with the result that such arm is rotated on its pivot in a counter-clockwise direction and through engagement of teeth 44 with orifices 42, rotates the half valve 28 to the position shown in Fig. 3, regardless of what degree of suction may be effective on such valve.

It should be noted that the spindle 24 is mounted somewhat to one side of the intake passage so that the valve 26 is somewhat off center. Therefore, the air pressure effective on the valve itself tends to move it toward open position as well as the suction operated means which has been previously referred to and will be described in detail later.

The position of the main valve is primarily determined by the automatic choke mechanism previously referred to, and to this end an operating arm 54 is secured to one end of the spindle 24, said arm being pivotally connected to a link 56 which at its opposite end is pivotally connected to an operating arm 58 secured in any desirable way to one end of a shaft 60 suitably journalled in a housing 62. The housing 62 is provided with a detachable bottom 63 secured in position by tangs 63*a* and secured to a plate 64 adapted to be secured to the previously mentioned hot spot by machine screws 66 or in any other desirable manner. A gasket 65 is provided between the plate and the manifold, above the housing 62 and secured thereto in any desirable way is a cylindrical housing 68 in which is received a Sylphon bellows 70, the function of which will be more fully described later.

A thermostat 72 is provided which is connected at one end to the shaft 60 as shown in Fig. 6 and at its other end is connected to pin 74 projecting from a connecting link 76 which is pivotally connected at its upper end to a pin 78 carried by the two depending arms of a yoke 80 secured to the solid head 82 which forms the bottom of the Sylphon bellows 70, the yoke extending downwardly through an opening 84 in the top of the housing 62.

A solid head 86 somewhat similar to the head 82 is provided at the upper end of the Sylphon bellows and this upper head is prevented from moving when a partial vacuum is produced within the bellows because it is clamped by flanges projecting from the nipple 88 to the top 90 of the cylindrical housing 68. Therefore, when a partial vacuum is created within the bellows by the communication of engine suction thereto, the lower head 82 of the bellows is pulled upwardly and this motion is opposed by the coil spring 92 which is received within the bellows.

To communicate the engine suction to the interior of the bellows there is provided a suction conduit 94 which, at one end communicates with a central bore 96 formed within the nipple 88 and communicating at one end with the interior of the bellows. An adjustable tapered metering valve 98 is received within the bore 96 and may be adjusted to determine the rate at which air is exhausted from the bellows and therefore, can determine the rate at which the head 82 of the bellows is pulled upwardly. The suction conduit at the opposite end extends through the plate 64 and registers with a suitable suction passage (not shown) in the wall of the manifold which communicates with the interior thereof.

Secured at the end of shaft 60 opposite to that on which the arm 58 is secured and within the housing 62 is an operating arm 100 which is used merely for calibration purposes. A suitable opening (not shown) is formed in the bottom 63 of housing 62 to communicate atmospheric pressure to the bottom head 82 of the Sylphon to force the head upwardly when a subatmospheric pressure is created within the bellows.

There may be formed in the lower end of the link 76 an opening 101 to which a manual operating connection for the choke may be connected and an opening 103 may be provided in the bottom plate 63 for such operating connection to extend through if desired.

Means are provided to adjustably determine the position of the throttle valve at idling in accordance with the position of the choke. For this purpose a link 110 has a bent over upper end which extends through a suitable hole in the operating arm. At its lower end this link projects through the horizontal portion of an angle bar 112 which has a vertical portion slidable in any form of suitable guiding means. The guiding means may be a track formed in the carburetor housing or may be a separate bracket 114 secured by a screw or other suitable means to the carburetor housing. The vertical portion of the element 112 slides in such guide means. The link is provided with an adjustable collar 116 above the horizontal portion of the bar 112 and received between this bar and a washer 118 at the lower end of the link is a spring 120 which normally retains the bar 112 in contact with said shoulder as shown in Fig. 2. The lower end of the angle bar is tapered as indicated at 12 and this tapered end cooperates with a screw 124 carried by the throttle operating arm 20.

The operation of this idle control mechanism is as follows. The link 110 moves with the main portion of the choke valve and its position at idling is determined by the thermostat. If the engine is cold it is held in its lower position and the collar 116 moves the angle bar 112 downwardly so that some part of its tapered lower end is opposite the screw 124 which will determine the closed or idling position of the throttle. If it is cold, a thicker portion of the tapered end of angle bar 112 is opposite screw 124 than if the temperature is higher because link 110 is in lower position. This will result in a wider open throttle and faster idling than when the temperature is higher.

In the construction shown, the link 110 can move upwardly without movement of the angle bar. This construction is provided so as to permit opening of the choke during the warm up period if the throttle remains in idling position.

The operation of the automatic operating mechanism for the valve 26 is as follows: If it be assumed that the engine and surrounding atmosphere are relatively cold, the thermostat is effective to hold the valve 26 in closed position, such position being determined by the thermostat. As the engine is turned over by the starting motor, suction is communicated to the bellows 70 and if the engine fails to start for any appreciable time, the suction in the bellows will build up sufficiently to open the valve 26 to admit enough air to prevent flooding.

When the engine starts to run, the suction effective both on the bellows and on the valve 26 increases and pulls the valve 26 open to a greater degree. At such time the spring held half valve 28 tends to lag behind the main valve owing to the spring tension which has to be overcome and prevents sufficient air entering to lean the mixture to a degree which will stall the engine or cause it to miss.

If the throttle is opened to accelerate during the warm up period, the suction effective on the bellows falls while the suction directly effective on the valve itself increases with the result that the valve is moved toward open position notwithstanding the drop in suction in the bellows. Under these conditions the half valve 28 also tends to restrict the passage to a greater degree than the valve 26 and so is effective to prevent too much leaning of the mixture during acceleration.

After the engine has warmed up sufficiently, the thermostat operates to move the parts to the position shown in Fig. 3 in which position the half valve has no restricting effect on the intake passage whatever.

With a spring 32 of proper tension the auxiliary or half valve steps up the fuel proportion in the mixture just enough to give smooth idling and part throttle operation, as well as proper acceleration performance during the warm up period. In plain tube carburetors there is a noticeable "flat spot" just at the point of transfer of fuel flow from the idle to main fuel jet, but this form of choke valve is effective to eliminate this "flat spot" substantially entirely.

While the embodiment of the present invention as herein disclosed, constitutes a preferred form, it is to be understood that other forms might be adopted, all coming within the scope of the claims which follow.

What is claimed is as follows:

1. In a carburetor for internal combustion engines having an air inlet and a choke valve assembly for controlling said air inlet which is automatically movable to different positions to variably restrict the flow of air into the carburetor to facilitate starting and is adapted to be moved to a non-restricting position when the engine is operating under normal conditions, said choke valve assembly comprising a larger main part and a smaller secondary part, said main part being constructed to constitute the greatest restriction to flow of air to the intake passage when the valve is in closed position and means for causing said secondary part to restrict the flow of air into the said passage to a greater degree than the main part of said valve when the valve is partly open.

2. In a carburetor for internal combustion engines having an air inlet and an unbalanced choke valve assembly for controlling said air inlet which is automatically movable to different positions to variably restrict the flow of air into the carburetor to facilitate starting and is adapted to be moved to a non-restricting position when the engine is operating under normal conditions, said choke valve assembly being operable by air pressure thereon and comprising a main part and a secondary part movable independently of and relatively to the said main part, both parts of said valve being movable by the effect of air pressure, and resilient means controlling the movement of said secondary part relative to the main part so that the secondary part tends to lag behind the main part as the valve is opened for the purpose of restricting the flow of air into the intake passage to a greater degree than the main part of such valve.

3. A choke valve such as defined in claim 2 in combination with thermally responsive means connected directly with said main part of the valve for operating said valve.

4. A choke valve such as defined in claim 2 in combination with thermally responsive means and means operable by engine suction connected directly with said main part of the valve for operating said valve.

5. A choke valve for carburetors having an air intake passage, comprising a main part and a secondary part, and so constructed that said main part constitutes the principal restriction in said air intake passage under certain operating conditions while the secondary valve constitutes the greater restriction under other operating conditions, a throttle, and means operable by said main part of the choke valve to limit the closing movement of the throttle valve so as to determine the idling position of the throttle in accordance with the position of said main part of the choke valve.

6. In a carburetor having an air intake passage, a choke valve in said passage and operable to control the flow of air therethrough, thermally responsive means controlling the opening of said choke, a throttle valve, a movable throttle stop device, mechanism operable by the choke valve for positioning said stop device, said mechanism being so constructed that said device is moved to a fast idle position when said choke is closed, to prevent full closing movement of said throttle valve and to permit faster than normal idling of the engine, and is movable to an inoperative position during opening movement of said choke valve and substantially before said choke valve is fully opened, said mechanism being constructed to permit at least partial opening of said choke valve without moving said stop device from said fast idle position.

7. In a carburetor having an air intake passage, a choke valve in said passage and operable to control the flow of air therethrough, means for positioning said choke valve in accordance with engine temperature and suction, a throttle valve, a movable throttle stop device, mechanism operable by the choke valve for positioning said stop device, said mechanism being so constructed that said device is moved to a fast idle position when said choke is closed, to prevent full closing movement of said throttle valve and to permit faster than normal idling of the engine, and is movable to an inoperative position during opening movement of said choke valve and substantially before said choke valve is fully opened, said mechanism being constructed to permit at least partial opening of said choke valve without moving said stop device from said fast idle position.

8. In a carburetor for internal combustion engines having an intake passage, a choke valve controlling the flow of air therethrough, said valve comprising main and secondary portions, operating means for said valve, said main portion providing the principal restriction to the flow of entering air when the valve is closed, means for moving the said main portion of said valve toward a position to provide a minimum restriction on the flow of air entering the carburetor and means tending to maintain the secondary portion of said valve in fixed position as the main portion of the valve is moved so that the secondary portion of the valve can restrict the flow of air to a greater degree than the main portion of such valve as the latter moves toward the position where it provides a minimum restriction to the flow of entering air.

9. In a carburetor for internal combustion engines having an intake passage, a choke valve controlling the flow of air therethrough, said valve comprising main and secondary portions, operating means for said valve, said main portion providing the principal restriction to the flow of entering air when the valve is closed, means for moving the said main portion of said valve toward a position to provide a minimum restriction on the flow of air entering the carburetor and a resilient member tending to maintain the secondary portion of said valve in position to materially restrict the flow of entering air as the main portion of the valve is so moved.

10. In a carburetor for internal combustion engines having an intake passage, a choke valve controlling the flow of air therethrough, said valve comprising main and secondary portions, operating means for said valve, said main portion providing the principal restriction to the flow of entering air when the valve is closed, means for moving said valve toward a position to provide a minimum restriction to the flow of air entering the intake passage, said means having direct connection with the main portion of said valve and a lost motion connection with the secondary portion of said valve whereby said main portion of the valve can be moved toward open position without corresponding movement of the secondary portion, and resilient means tending to hold said secondary portion of said valve in position to provide maximum restriction to the air flow as the main portion of said valve is moved toward a position to provide minimum restriction to the flow of air.

11. A choke valve construction for carburetors having an intake passage, said valve comprising main and secondary portions, said main portion providing the principal restriction to the flow of entering air when the valve is closed, means for moving said valve toward a position to provide a minimum restriction to the flow of air entering the intake passage, said means having direct connection with the main portion of said valve and a lost motion connection with the secondary portion of said valve whereby said main portion of the valve can be moved toward open position without corresponding movement of the secondary portion, and resilient means tending to hold said secondary portion of said valve in position to provide maximum restriction to the air flow as the main portion of said valve is moved toward a position to provide minimum restriction to the flow of air, and means operable when the main portion of said valve reaches its full open or minimum flow restricting position to move said secondary portion of said valve to its full open position.

12. A choke valve construction for carburetors having an intake passage, said valve comprising main and secondary portions, said main portion providing the principal restriction to the flow of entering air when the valve is closed, means for moving said valve toward a position to provide a minimum restriction to the flow of air entering the intake passage, said means having direct connection with the main portion of said valve and a lost motion connection with the secondary portion of said valve whereby said main portion of the valve can be moved toward open position without corresponding movement of the secondary portion, and resilient means tending to hold said secondary portion of said valve in position to provide maximum restriction to the air flow as the main portion of said valve is moved toward a position to provide minimum restriction to the flow of air, and a member carried by the valve assembly and operable when the main portion of said valve reaches its full open or minimum flow restricting position to move said secondary portion of said valve to its full open position, said member being operated by engagement thereof with the wall of the intake passage when the main portion of the valve reaches full open position.

13. In a carburetor having an air intake passage, a choke valve comprising a main part and a secondary part, and so constructed that said main part constitutes the principal restriction in the air intake passage under certain operating conditions, while the secondary part of said valve constitutes the greater restriction to the admission of air into said intake passage under other operating conditions, thermally responsive means for positioning the choke valve to increase the fuel proportion in the mixture inversely as to the temperature and means operable by engine suction to move the valve to decrease the proportion of fuel in the mixture.

14. In a carburetor for internal combustion engines having an air inlet passage, a choke valve assembly in said inlet passage movable to variably regulate the flow of air through said passage and operating means therefor, said choke valve assembly comprising main and secondary parts, said main part being of such size and so arranged as to substantially close the intake passage when the valve assembly is in its closed position and to restrict the passage to a greater degree than does the secondary part when the valve assembly is in such position, and said secondary part being of such size and so arranged with respect to the main part that as the valve assembly is moved toward open position the secondary part will occupy an obstructing position nearer the adjacent wall of the intake passage than the main part of the valve assembly so as to control air flow through said passage to a greater degree than the main part of said valve assembly.

15. In a carburetor for internal combustion engines having an air inlet passage, a choke valve assembly in said inlet passage movable to variably regulate the flow of air through said passage and operating means therefor, said choke valve assembly comprising main and secondary parts, said main part being of such size and so arranged as to substantially close the intake passage when the valve assembly is in its closed position and to restrict the passage to a greater degree than does the secondary part when the valve assembly is in such position, and said secondary part being relatively movable with respect to the main part of the valve assembly and also of such a size and so arranged with respect thereto that as the valve assembly is moved toward its open position the secondary part will occupy an obstructing position nearer the adjacent wall of the intake passage than the main part of the valve assembly so as to control air flow through said passage to a greater degree than the main part of said valve assembly.

16. In a carburetor for internal combustion engines having an air inlet passage, a choke valve assembly in said inlet passage movable to variably regulate the flow of air through said passage and operating means therefor, said choke valve assembly comprising main and secondary parts, said main part being of such size and so arranged as to substantially close the intake passage when the valve assembly is in its closed position and to restrict the passage to a greater degree than does the secondary part when the valve assembly is in such position, said secondary part being relatively movable with respect to the main part of said valve assembly, and resilient means connecting the secondary part to the main part, said resilient means being adapted to hold said secondary part in such position with respect to the main part that as the valve assembly is moved toward its open position, the secondary part will occupy an obstructing position nearer the adjacent wall of the intake passage than the main part of the valve assembly so as to control air flow through said passage to a greater degree than the main part of said valve assembly.

17. In a carburetor for internal combustion engines having an air inlet passage, a choke valve assembly in said inlet passage movable to variably regulate the flow of air through said passage and operating means therefor, said choke valve assembly comprising a relatively large main part and a smaller secondary part, said main part being of such size and so arranged as to substantially close the intake passage when the valve assembly is in its closed position, and said smaller secondary part being so arranged with respect to the main part of the valve assembly that as the valve assembly is moved toward its open position and the main part of said valve assembly is moved away from the wall of the intake passage, the secondary part of said valve assembly is moved so that the secondary part will occupy an obstructing position nearer the adjacent wall of the intake than the main part of the valve assembly so as to control the air flow through said passage to a greater degree than the main part of said valve assembly.

18. In a carburetor having an air intake passage and a mixture outlet passage, a choke valve assembly positioned in the air intake passage of said carburetor and effective to regulate the flow of air therethrough, thermally responsive means operable to hold the valve assembly in position to close the intake passage at low temperatures and to hold the valve assembly in its wide open position when the engine reaches its normal operating temperature, suction operated means effective to move the valve assembly toward its open position during the warm-up period of the engine, said choke valve assembly including main and secondary parts, said main part of such size and so arranged as to substantially close the intake and to restrict such passage to a greater degree than does the secondary part when the valve assembly is held in its closed position by the thermally responsive means, and said secondary part being of such size and so arranged with respect to the main part and the wall of the intake passage that as the valve assembly is moved toward open position by engine suction, the secondary part of said valve assembly will be moved to a position where it is nearer the adjacent wall of the intake passage than the main part and will obstruct the flow of entering air to a greater degree than does the main part of said valve assembly.

19. In a carburetor having an air intake passage and a mixture outlet passage, a choke valve assembly positioned in the air intake passage of said carburetor and effective to regulate the flow of air therethrough, thermally responsive means operable to hold the valve assembly in position to close the intake passage at low temperatures and to hold the valve assembly in its wide open position when the engine reaches its normal operating temperature, suction operated means effective to move the valve assembly toward its open position during the warm-up period of the engine, said choke valve assembly including main and secondary parts, said main part of such size and so arranged as to substantially close the intake and to restrict such passage to a greater degree than does the secondary part when the valve assembly is held in its closed position by the thermally responsive means, and said secondary part being movable relative to the main part and of such size and so arranged with respect to the main part and the wall of the intake passage that as the valve assembly is moved toward open position by engine suction, the secondary part of said valve assembly will be moved to a position where it is nearer the adjacent wall of the intake passage than the main part and will obstruct the flow of entering air to a greater degree than does the main part of said valve assembly.

20. In a carburetor having an air intake passage and a mixture outlet passage, a choke valve assembly positioned in the air intake passage of said carburetor and effective to regulate the flow of air therethrough, thermally responsive means operable to hold the valve assembly in position to close the intake passage at low temperatures and to hold the valve assembly in its wide open position when the engine reaches its normal operating temperature, suction operated means effective to move the valve assembly toward its open position during the warm up period of the engine, said choke valve assembly including main and secondary parts, said main part of such size and so arranged as to substantially close the intake and to restrict such passage to a greater degree than does the secondary part when the valve assembly is held in its closed position by the thermally responsive means, and said secondary part being movable relative to the main part and resilient means connecting the secondary part to the main part, said resilient means being adapted to maintain the secondary part in such position relative to the main part during movement of the valve assembly toward open position by engine suction that the secondary part will be moved to a position where it is nearer the adjacent wall of the intake passage than the main part and will obstruct the flow of entering air to a greater degree than does the main part of said valve assembly.

21. In a carburetor having an air intake passage and a mixture outlet passage, a choke valve assembly positioned in the air intake passage of said carburetor and effective to regulate the flow of air therethrough, thermally responsive means operable to hold the valve assembly in position to close the intake passage at low temperatures and to hold the valve assembly in its wide open position when the engine reaches its normal operating temperature, suction operated means effective to move the valve assembly toward its open position during the warm-up period of the engine, said choke valve assembly including a relatively large main part and a smaller secondary part, said main part of such size and so arranged as to substantially close the intake and to restrict such passage to a greater degree than does the secondary part when the valve assembly is held in its closed position by the thermally responsive means, and said secondary part being of such size and so arranged with respect to the main part and the wall of the intake passage that as the valve assembly is moved toward open position by engine suction, the secondary part of said valve assembly will be moved to a position where it is nearer the adjacent wall of the intake passage than the main part and will obstruct the flow of entering air to a greater degree than does the main part of said valve assembly.

CLARENCE H. JORGENSEN.

REFERENCES CITED

The following references are of record in the file of this patent:

UNITED STATES PATENTS

| Number | Name | Date |
|---|---|---|
| 947,712 | Henricks | Jan. 25, 1910 |
| 971,689 | Schebler | Oct. 4, 1910 |
| 1,413,985 | Hodges | Apr. 25, 1922 |
| 1,442,632 | Shortt | Jan. 16, 1923 |
| 1,630,614 | Hifner | May 31, 1927 |
| 1,672,192 | Aseltine | June 5, 1928 |
| 1,673,306 | Ball | June 12, 1928 |
| 1,814,143 | Geiger | July 14, 1931 |
| 1,894,354 | Kommer et al. | Jan. 17, 1933 |
| 1,955,204 | Sawyer | Apr. 17, 1934 |